Aug. 15, 1967  D. KITCHEN  3,335,563
INTERNAL COMBUSTION ENGINES
Filed Oct. 11, 1965                                           3 Sheets-Sheet 1
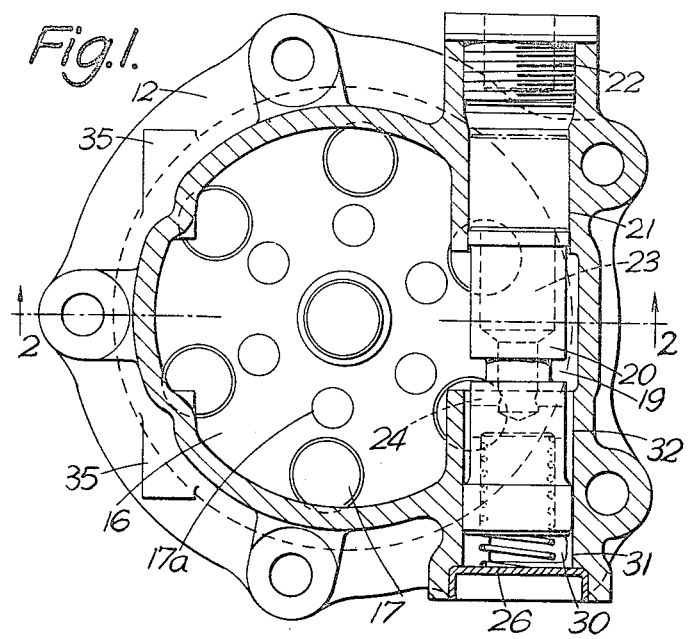
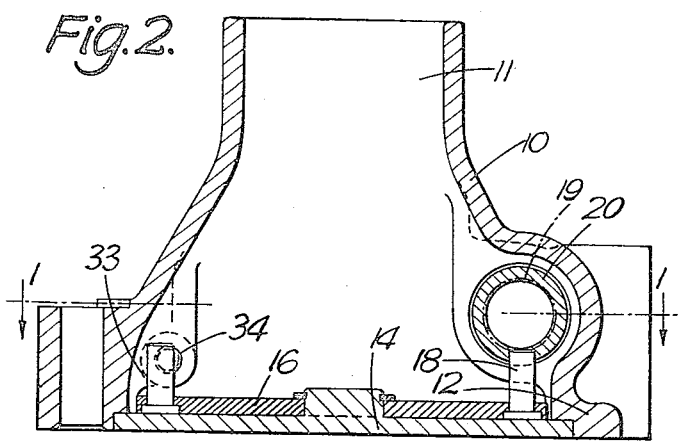

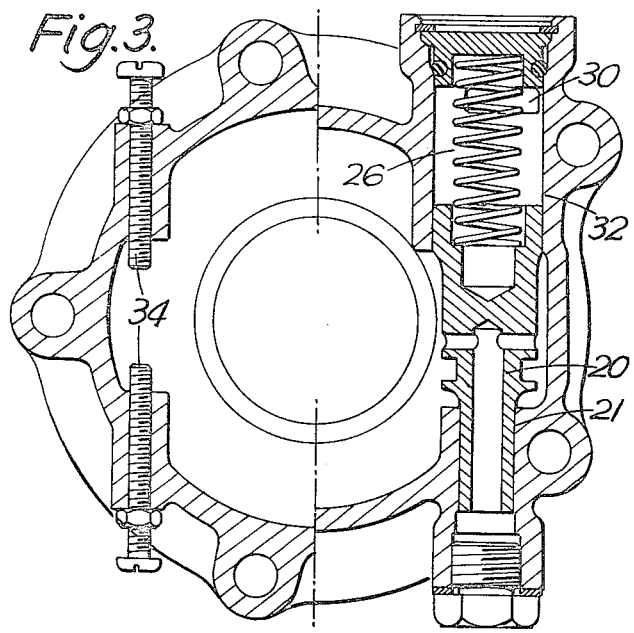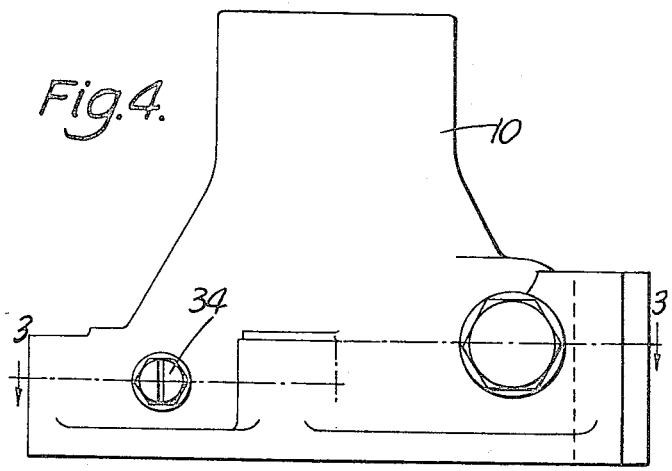

Aug. 15, 1967     D. KITCHEN     3,335,563
INTERNAL COMBUSTION ENGINES
Filed Oct. 11, 1965     3 Sheets-Sheet 3
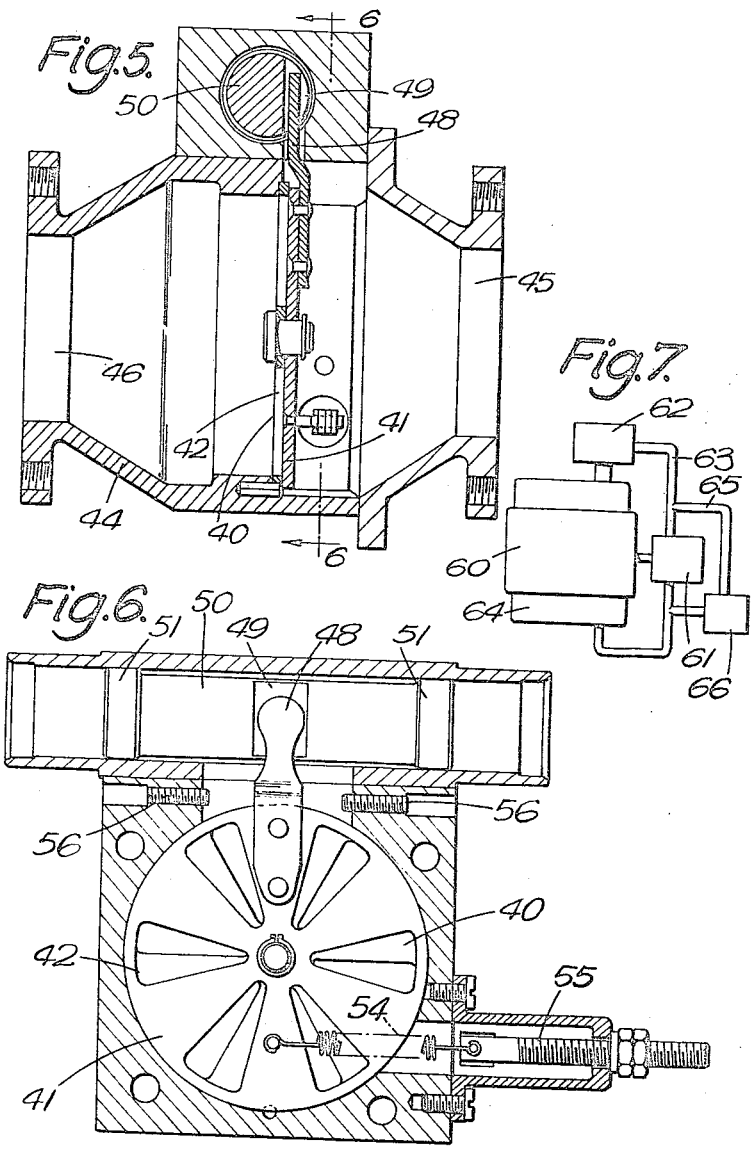

United States Patent Office 3,335,563
Patented Aug. 15, 1967

3,335,563
INTERNAL COMBUSTION ENGINES
Donald Kitchen, Maidstone, Kent, England, assignor to Tilling-Stevens Limited, Maidstone, England, a British company
Filed Oct. 11, 1965, Ser. No. 494,621
7 Claims. (Cl. 60—13)

The invention relates to internal combustion engines of the kind having an exhaust driven turbo blower followed in series relation by an engine driven positive action blower for charging air or combustible mixture to the engine cylinder or cylinders. The air may be supplied for scavenge purposes, or for combustion or both, especially in the case of a two-stroke cycle engine, and it may provide a supercharge.

The invention provides an internal combustion engine of the above kind in which there is a return by-pass around the positive action blower and in which there is for controlling flow through the by-pass a pressure relief valve of the rotary shutter type having a pressure difference responsive device open to pressure upstream of the positive action blower and downstream thereof respectively, and operative to rotate the shutter to expose or partly expose the aperture or apertures when the pressure difference across the blower exceeds a predetermined value.

The pressure difference responsive device may be a piston working in a cylinder or cylinders arranged to be open at one end of the piston upstream of the blower and the other end of the piston downstream of the blower.

There may be a pin and slot connection between the shutter and the piston.

There may also be stop means to limit the rotation of the shutter in either sense.

It is preferred that there is a return spring opposing rotation of the shutter in the opening direction.

In a preferred form of the engine the positive blower is of the Roots type.

Some specific embodiments of internal combustion engines in accordance with the invention will now be described by way of example and with reference to the accompanying drawings in which:

FIGURE 1 is a section on the line 1—1 in FIGURE 2, of one construction of valve.

FIGURE 2 is a section on the line 2—2 in FIGURE 1, the shutter and piston being shown in mid-position in this view, FIGURE 3 is a section, on the line 3—3 in FIGURE 4 showing a modification, FIGURE 4 is an outside view of the modification and corresponding to FIGURE 2, FIGURE 5 is a section through another construction of valve, FIGURE 6 is a section of the line 4—4 in FIGURE 5, and FIGURE 7 is a diagrammatic view of an engine.

In each embodiment the engine 60 is an opposed piston two-stroke cycle multi-cylinder diesel engine having an engine driven Roots blower 61 for supplying scavenging and combustion air to the inlet manifold 64. The engine also has an exhaust driven turbo blower 62 which feeds air to the inlet of the Roots blower 61 via a pipe 63. There is a return by-pass 65 around the Roots blower and in this by-pass there is a re-circulation valve 66.

One embodiment of the valve is shown in FIGURES 1 and 2. The valve comprises a housing 10 with an inlet 11 connected into the outlet conduit from the Roots blower to the engine. At the bottom of the housing there is a flange 12 by which the housing is attached to the inlet to the Roots blower, the outlet from the turbo-blower also being connected into this inlet. The bottom of the housing is partly closed by a perforated plate 14. Over the plate 14 there is rotatable plate or shutter 16 with perforations 17, 17a which are movable by partial rotation of the plate into and out of registration with the perforations in plate 16 and thus to open and close the valve. The perforations are seen in registration in FIGURE 1.

Upstanding from the plate 16 there is a pin 18 which engages in a groove 19 in a piston 20. One end of the piston is slidable in a cylinder 21 closed at its outer end by a plug 22. This end of the cylinder is open to the upstream pressure in the housing through axial and radial passages 23, 24 in the piston so that the outlet pressure from the Roots blower acts on the end of the piston and tends to move the piston downwardly, as seen in FIGURE 1, and hence to move the shutter to the open position. A spring 26 resists such movement of the piston and is pre-loaded to an extend such that the valve begins to open at about 1400 to 1600 engine r.p.m.

A port 30 in a cylinder 32 for the other end of the piston is open to downstream pressure.

There is a further pin 33 upstanding from the plate 16 which engages with opposed stops 34 which are screwed into bosses 35 and project to an adjustable extent inwardly of the housing and limit the rotation of the shutter.

In a modified form of the above example, (see FIGURES 3 and 4) the cylinder 21 and the portion of the piston 20 working therein are of reduced diameter so that the upstream pressure force acting on the piston is reduced. The other end of the piston and its guide 32 are unchanged as also is the spring.

FIGURES 5 and 6 show another construction of the valve in which the fixed valve plate 40 and the rotatable shutter 41 have apertures 42 of sector shape. The casing 44 has an inlet opening 45 connected to the output of the Roots blower and an outlet 46 connected to the blower inlet. The shutter 41 has an arm 48 which enters a slot 49 in a piston 50. The output or upstream pressure from the blower is applied to the end 51 of the piston and the other end is connected to downstream pressure.

Attached to the shutter there is one end of a spring 54, the other end being attached to an adjustable anchor 55. The spring acts in opposition to the pressure on the end 51 of the piston and tends to move the shutter to the closed position.

Two adjustable stop screws 56 are provided in the casing and co-operate with the arm 48 to limit the movements of the shutter.

I claim:

1. An internal combustion engine of the kind having an exhaust driven turbo blower followed in series relation by an engine driven positive action blower for charging air or combustible mixture to the engine cylinder or cylinders and a return by-pass around the positive action blower in which there is for controlling flow through the by-pass a pressure relief valve of the rotary shutter type having a pressure difference responsive device open to pressure upstream of the positive action blower and downstream of same respectively, and operative to rotate the shutter to expose or partly expose the aperture or apertures when the pressure difference across the blower exceeds a predetermined value.

2. An internal combustion engine as claimed in claim 1 in which the pressure difference responsive device is a piston working in a cylinder or cylinders arranged to be open at one end of the piston upstream of the blower and at the other end of the piston downstream of the blower.

3. An internal combustion engine as claimed in claim 2 in which there is a pin and slot connection between the shutter and the piston.

4. An internal combustion engine as claimed in claim 1 in which there is stop means to limit the rotation of the shutter in either sense.

5. An internal combustion engine as claimed in claim 1 in which there is a return spring opposing rotation of the shutter in the opening direction.

6. An internal combustion engine as claimed in claim 1 in which the positive action blower is of the Roots type.

7. An internal combustion engine of the kind having an exhaust driven turbo blower followed in series relation by an engine driven positive action blower for charging air or combustible mixture to the engine cylinder or cylinders and a return by-pass around the positive action blower in which there is for controlling flow through the by-pass a pressure relief valve which comprises a housing having a throughway connected into the by-pass and of substantially the same diameter as the by-pass, first and second shutter extending across the throughway, means to fix the first shutter to the housing and means to mount the second shutter for rotation about the axis of the throughway openings in both shutters, a cylinder formed in the housing and extending at right angles to the throughway, a double acting piston mounted on the cylinder, means to connect one end of the piston to the input of the positive action blower and means to connect the other side of the piston to the output of the said blower, means to connect the rotatable shutter to the piston for movement therewith, and spring means to bias the rotatable shutter in the same direction of rotation as pressure is applied to the piston from the said outlet of the blower, the arrangement being such that the openings in the shutters are out of register when there is no pressure at the said outlet and the openings come into register as the rotatable shutter moves against the spring on increase of pressure at the outlet.

References Cited

UNITED STATES PATENTS

| 1,818,767 | 8/1931 | Swarthout | 230—22 |
| 1,826,638 | 10/1931 | Schwerdtfeger | 123—65 |
| 2,891,524 | 6/1959 | Scheiterlein | 123—65 |
| 2,983,280 | 5/1961 | Maison | 137—625.31 |

FOREIGN PATENTS

| 943,203 | 5/1956 | Germany. |

CARLTON R. CROYLE, *Primary Examiner.*

D. HART, *Assistant Examiner.*